(12) United States Patent
Imanuel

(10) Patent No.: US 8,447,365 B1
(45) Date of Patent: May 21, 2013

(54) VEHICLE COMMUNICATION SYSTEM

(76) Inventor: Howard M. Imanuel, Ft. Myers, FL (US)

( * ) Notice: Subject to any disclaimer, the term of this patent is extended or adjusted under 35 U.S.C. 154(b) by 432 days.

(21) Appl. No.: 12/462,864

(22) Filed: Aug. 11, 2009

(51) Int. Cl.
*H04M 1/00* (2006.01)

(52) U.S. Cl.
USPC ............... 455/569.2; 455/569.1; 455/566; 455/575.9; 455/90.3

(58) Field of Classification Search
USPC .......... 455/566, 369.1, 569.2, 575.9, 90.3, 455/569.1
See application file for complete search history.

(56) References Cited

U.S. PATENT DOCUMENTS

| | | | |
|---|---|---|---|
| 5,848,364 A * | 12/1998 | Ohashi | 701/26 |
| 6,348,877 B1 * | 2/2002 | Berstis et al. | 340/980 |
| 2005/0206741 A1 * | 9/2005 | Raber | 348/211.2 |
| 2006/0103590 A1 * | 5/2006 | Divon | 345/7 |
| 2006/0189309 A1 * | 8/2006 | Good et al. | 455/427 |
| 2006/0279065 A1 * | 12/2006 | Reed | 280/288.4 |
| 2008/0039998 A1 * | 2/2008 | Fein et al. | 701/36 |
| 2008/0212215 A1 * | 9/2008 | Schofield et al. | 359/844 |
| 2010/0315376 A1 * | 12/2010 | Choi | 345/175 |

\* cited by examiner

*Primary Examiner* — Tuan Pham

(57) ABSTRACT

A vehicle has a dashboard, a windshield, a driver area with a steering wheel. A transceiver transmits and receives digital data for both text messages and voice messages. A voice activated wireless electronic device with a keyboard and a screen is built into the dashboard. A voice assembly includes a speaker and a microphone. A text assembly includes a display mounted in the dashboard. A joystick is adapted to allow a driver to manipulate data on both the screen of the electronic device and the display. A central processing unit operatively couples the transceiver, electronic device, speaker, microphone, and joystick.

1 Claim, 3 Drawing Sheets

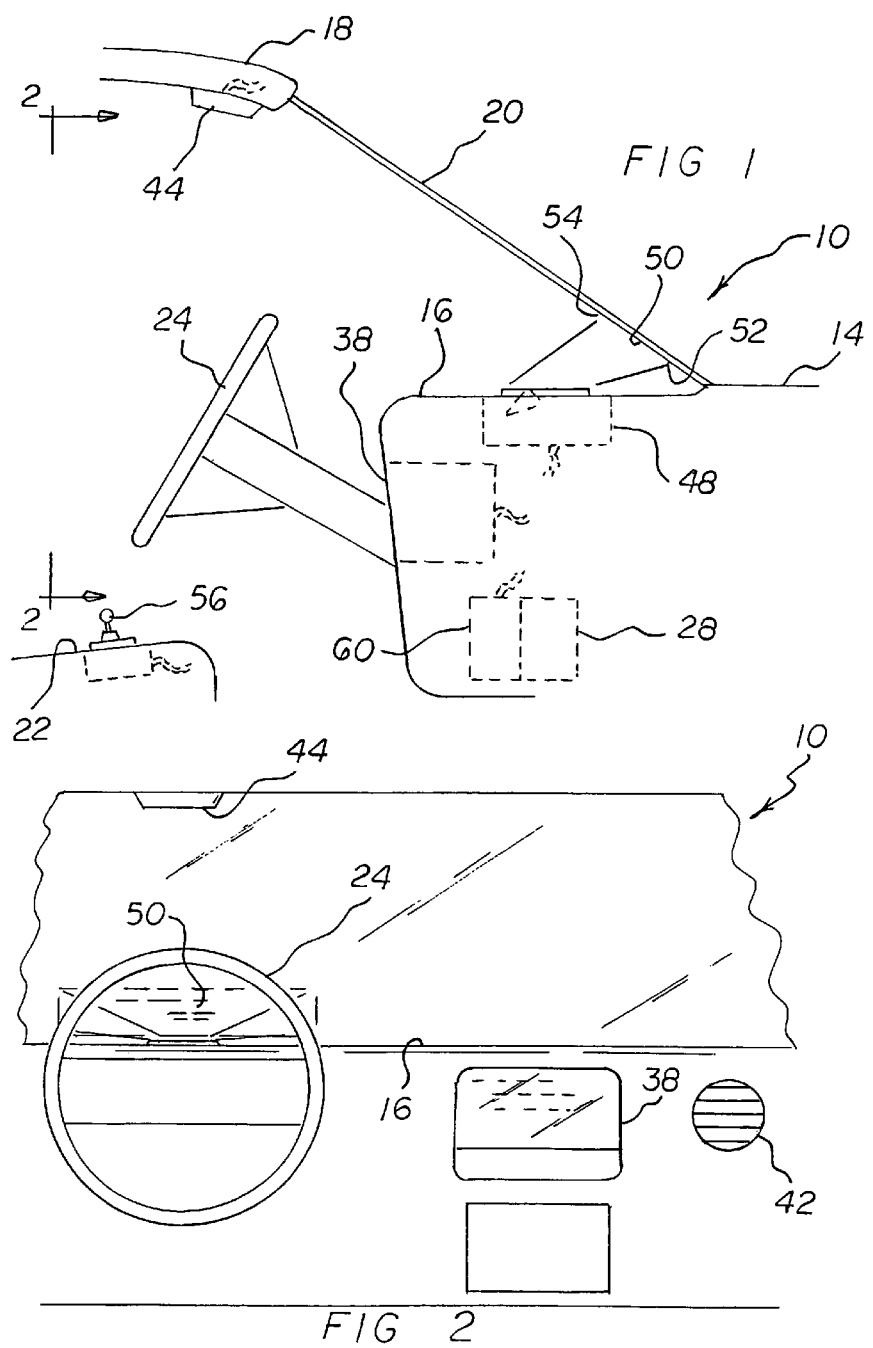

VEHICLE COMMUNICATION SYSTEM

BACKGROUND OF THE INVENTION

1. Field of the Invention

The present invention relates to a vehicle communication system and more particularly pertains to transmitting and receiving messages in text and voice form in a safe and convenient manner while operating a vehicle.

2. Description of the Prior Art

The use of vehicle communication systems of known designs and configurations is known in the prior art. More specifically, vehicle communication systems of known designs and configurations previously devised and utilized for the purpose of providing communications to and from drivers are known to consist basically of familiar, expected, and obvious structural configurations, notwithstanding the myriad of designs encompassed by the crowded prior art which has been developed for the fulfillment of countless objectives and requirements.

While the prior art devices fulfill their respective, particular objectives and requirements, they do not describe a vehicle communication system that allows for transmitting and receiving messages in text and voice form in a safe and convenient manner while operating a vehicle.

In this respect, the vehicle communication system according to the present invention substantially departs from the conventional concepts and designs of the prior art, and in doing so provides an apparatus primarily developed for the purpose of transmitting and receiving messages in text and voice form in a safe and convenient manner while operating a vehicle.

Therefore, it can be appreciated that there exists a continuing need for a new and improved vehicle communication system which can be used for transmitting and receiving messages in text and voice form in a safe and convenient manner while operating a vehicle. In this regard, the present invention substantially fulfills this need.

SUMMARY OF THE INVENTION

In view of the foregoing disadvantages inherent in the known types of vehicle communication systems of known designs and configurations now present in the prior art, the present invention provides an improved vehicle communication system. As such, the general purpose of the present invention, which will be described subsequently in greater detail, is to provide a new and improved vehicle communication system and method which has all the advantages of the prior art and none of the disadvantages.

To attain this, the present invention essentially comprises a vehicle communication system for use by a driver in transmitting messages and receiving messages in which both the transmitting and receiving are done in text form and in voice form in a safe and convenient manner. First provided is a vehicle having a dashboard and a roof and a windshield between the dashboard and the roof. The windshield has a top adjacent to the roof and a bottom adjacent to the dashboard separated by a height. The vehicle also has a driver area and a steering wheel.

Next provided is a transceiver. The transceiver includes a transmitter adapted to transmit digital data for both text messages and voice messages. The transceiver also includes a receiver adapted to receive digital data for both text messages and voice messages.

A voice activated wireless electronic device is next provided. The electronic device has a keyboard and a screen. The electronic device is built into the dashboard and adapted to receive and transmit digital data in both text form and voice form. In the preferred embodiment, the electronic device uses Bluetooth protocol.

Next provided is a voice assembly. The voice assembly includes a speaker. The speaker is mounted in the roof adjacent to the windshield above the driver area. The voice assembly also includes a microphone mounted in the dashboard in proximity to the driver area.

Next provided is a text assembly. The text assembly includes a projector mounted in the dashboard and adapted to create a heads-up display on the windshield. The lower extent of the display is adjacent to the dashboard. The upper extent of the display is below a mid-point of the windshield. The height of the display is between 10 percent and 20 percent of the height of the windshield. The text assembly also includes a joystick in the driver area within convenient reach of a driver. The joystick is adapted to allow the driver to manipulate data on both the screen of the electronic device and the display.

Next provided is a central processing unit, hereinafter referred to as a CPU. The CPU is operatively couples the transceiver, electronic device, speaker, microphone and projector for transmitting and receiving messages in text form and in voice form.

A remote telecommunication device is next provided. The telecommunication device is chosen from the class of telecommunication devices including cell phones, telephones, computers, and like devices.

Lastly, intermediate devices are provided. The intermediate devices include satellites and towers to facilitate data transmission between the remote telecommunication device and the transceiver.

A computer-readable medium having instructions stored thereon that when executed by a computer, causes a voice activated wireless Bluetooth device mounted in a motor vehicle permitting the following instructions to be executed: open a short message service (SMS) menu selected by a user of a first telecommunications terminal; activate an interactive voice response (IVR) option selected from the SMS menu that would be displayed inside the vehicle above the dashboard area using, for example, holographic technology whereby the spoken message can be viewed in text form via the use of interactive voice response technology. The spoken input comprises a spoken message which will be translated into a text message which will then be transmitted to a second telecommunications terminal over a telecommunications network. Proper implementation will allow bi-directional transmission of voice to text message and vice versa to anywhere in the world.

The invention, a voice-to-text and text-to-voice messaging system is mainly for cell phone users in automobiles and other moving vehicles while they are driving and is designed to help reduce vehicular accidents and save lives that are currently at risk by text message users, both young and old. The system is for speaking into a Bluetooth phone system linkup while driving, with the driver's voice sent to a receiving phone as text or a voice message. The recipient phone can then be either voice responding or text responding by its user back to the original cell phone in voice and/or text, the latter projected either on the heads-up display on the lower end of the driver's side windshield or on the Blue-tooth-linked navigation ro radio display. With the heads-up windshield display, the driver can continue in a safe and sane manner handling the vehicle, while still being able to read the text at will and then respond through the minuscule microphone on the vehicle connected to his enabled cell phone, which in turn, is linked by a central telecommunications medium and thus transmitted simultaneously to the recipient cell user as either a voice or print text message.

The system is adapted to be programmed through the keyboard of the electronic device. The system has a voice to voice default orientation. The keyboard is operable to re-program the system only when the vehicle is a park orientation.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved vehicle communication system which has all of the advantages of the prior art vehicle communication systems of known designs and configurations and none of the disadvantages.

It is another object of the present invention to provide a new and improved vehicle communication system which may be easily and efficiently manufactured and marketed.

It is further object of the present invention to provide a new and improved vehicle communication system which is of durable and reliable constructions.

An even further object of the present invention is to provide a new and improved vehicle communication system which is susceptible of a low cost of manufacture with regard to both materials and labor, and which accordingly is then susceptible of low prices of sale to the consuming public, thereby making such vehicle communication system economically available to the buying public.

Even still another object of the present invention is to provide a vehicle communication system for transmitting and receiving messages in text and voice form in a safe and convenient manner while operating a vehicle.

Lastly, it is an object of the present invention to provide a new and improved vehicle communication system wherein a vehicle has a dashboard, a windshield, and a driver area with a steering wheel. A transceiver transmits and receives digital data for both text messages and voice messages. A voice activated wireless electronic device with a keyboard and a screen is built into the dashboard. A voice assembly includes a speaker and a microphone. A text assembly includes a display mounted in the dashboard. A joystick is adapted to allow a driver to manipulate data on both the screen of the electronic device and the display. A central processing unit operatively couples the transceiver, electronic device, speaker, microphone, and joystick.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevational view of a vehicle equipped with a telecommunication system constructed in accordance with the principles of the present invention.

FIG. 2 is a front elevational view taken along line 2-2 of FIG. 1.

The same reference numerals refer to the same parts throughout the various Figures for the various embodiments of the invention.

DESCRIPTION OF THE PREFERRED EMBODIMENT

Figure 3:
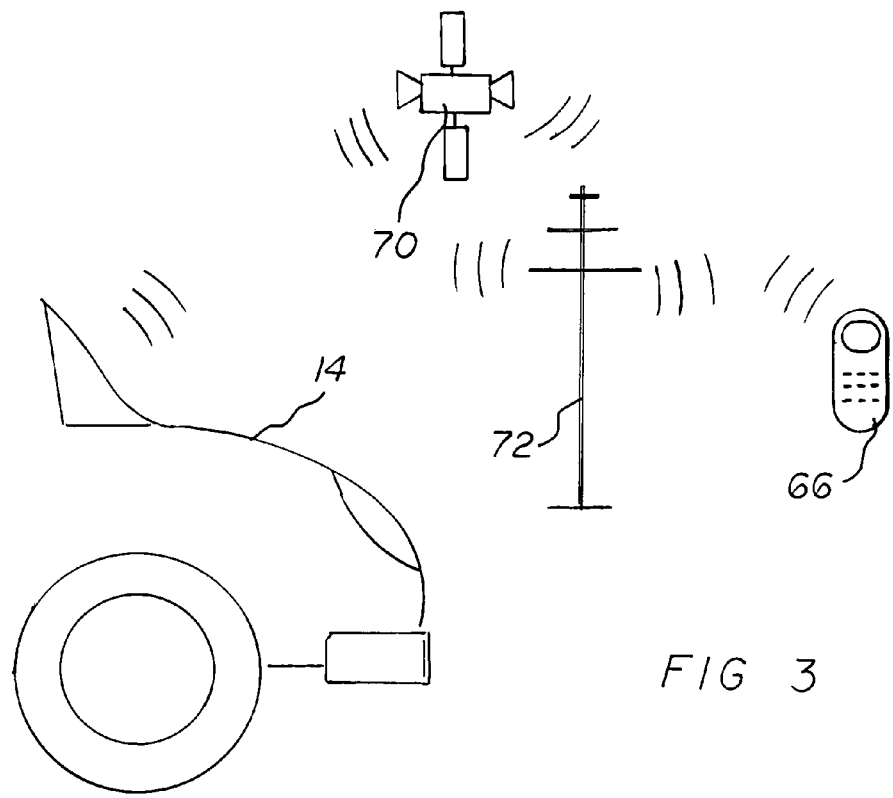
FIG. 3 is a side elevational view similar to FIG. 1 but also including remote components.
Figure 4:
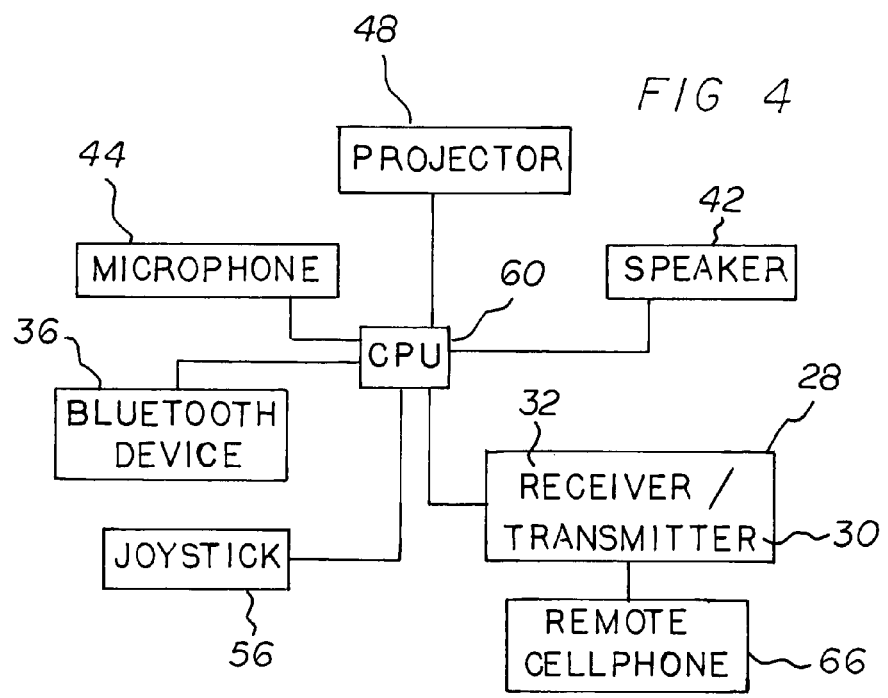
FIG. 4 is a block diagram of the electronic components of the system.

With reference now to the drawings, and in particular to FIG. 1 thereof, the preferred embodiment of the new and improved vehicle communication system embodying the principles and concepts of the present invention and generally designated by the reference numeral 10 will be described.

The present invention, the vehicle communication system 10 is comprised of a plurality of components. Such components in their broadest context include a vehicle, a transceiver, a voice activated wireless electronic device, a voice assembly, a text assembly, a joystick, and a central processing unit. Such components are individually configured and correlated with respect to each other so as to attain the desired objective.

The vehicle communication system 10 is for use by a driver in transmitting messages and receiving messages. Both the transmitting and receiving are done in text form and in voice form. The communicating is done in a safe and convenient manner. First provided is a vehicle 14. The vehicle has a dashboard 16 and a roof 18. The vehicle has a windshield 20 between the dashboard and the roof. The windshield has a top adjacent to the roof and a bottom adjacent to the dashboard. The top and bottom are separated by a height. The vehicle also has a driver area 22 with a steering wheel 24.

Next provided is a transceiver 28. The transceiver includes a transmitter 30 adapted to transmit digital data for both text messages and voice messages. The transceiver also includes a receiver 32 adapted to receive digital data for both text messages and voice messages.

A voice activated wireless electronic device 36 is next provided. The electronic device has a keyboard and a screen 38. The electronic device is built into the dashboard and adapted to receive and transmit digital data in both text form and voice form. In the preferred embodiment, the electronic device uses Bluetooth protocol.

Next provided is a voice assembly. The voice assembly includes a speaker 42. The speaker is mounted in the roof adjacent to the windshield above the driver area. The voice assembly also includes a microphone 44 mounted in the dashboard in proximity to the driver area.

Next provided is a text assembly. The text assembly includes a projector 48 mounted in the dashboard and adapted to create a heads-up display 50 on the windshield. The lower extent 52 of the display is adjacent to the dashboard. The upper extent 54 of the display is below a mid-point of the windshield. The height of the display is between 10 percent and 20 percent of the height of the windshield. The text assembly also includes a joystick 56 in the driver area within convenient reach of a driver. The joystick is adapted to allow the driver to manipulate data on both the screen of the electronic device and the display.

Next provided is a central processing unit 60, hereinafter referred to as a CPU. The CPU is operatively couples the transceiver, electronic device, speaker, microphone and projector for transmitting and receiving messages in text form and in voice form.

A remote telecommunication device 66 is next provided. The telecommunication device is chosen from the class of telecommunication devices including cell phones, telephones, computers, and like devices.

Lastly, intermediate devices are provided. The intermediate devices include satellites 70 and towers 72 to facilitate data transmission between the remote telecommunication device and the transceiver.

The system is adapted to be programmed through the keyboard of the electronic device. In addition, the system has a voice to voice default orientation. Lastly, the keyboard is operable to re-program the system only when the vehicle is a park orientation.

Figure 5:
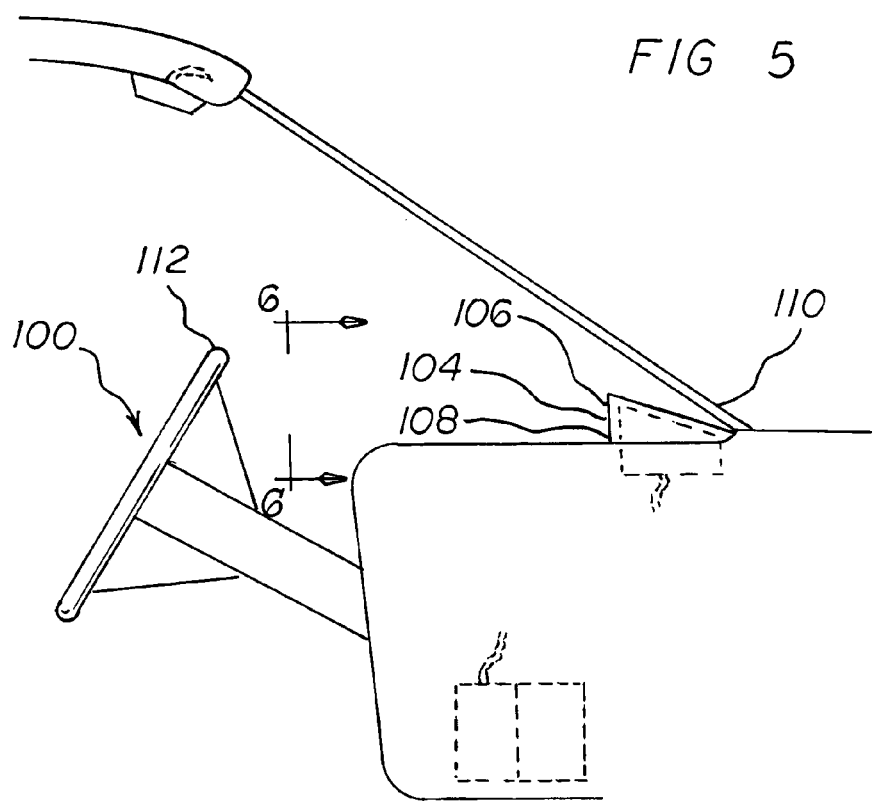
FIG. 5 is a side elevational view similar to FIG. 1 but illustrating an alternate embodiment of the invention.
Figure 6:
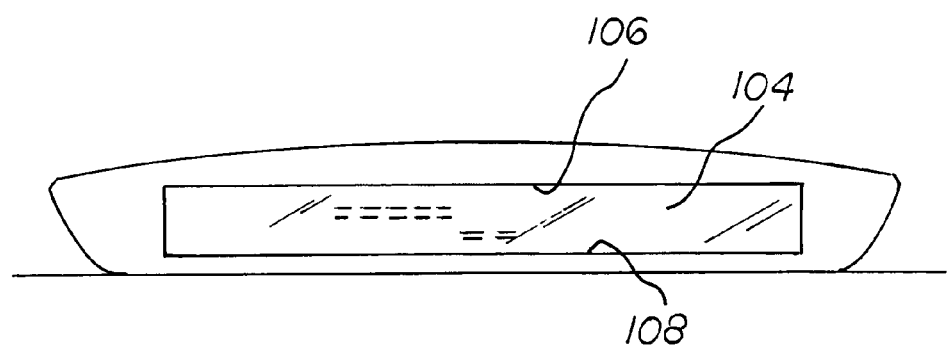
FIG. 6 is a front elevational view taken along line 6-6 of FIG. 5.

An alternate embodiment of the invention 100 is illustrated in FIGS. 5 and 6. In this embodiment, the display is a screen 104 in front of the steering wheel and the driver area. The screen having an upper extent 106 at a first elevation and a lower extent 108 at a second elevation. The windshield has a lower extent 110 at a third elevation adjacent to the second elevation of the screen. The steering wheel has an upper extent 112 at a fourth elevation above the first elevation of the screen.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A vehicle communication system for use by a driver in transmitting messages and receiving messages, both the transmitting and receiving being done in text form and in voice form, the system comprising, in combination:

a vehicle having a dashboard and a roof and a windshield between the dashboard and the roof, the windshield having a top adjacent to the roof and a bottom adjacent to the dashboard, the top and bottom being separated by a height, the vehicle also having a driver area with a steering wheel;

a transceiver including a transmitter adapted to transmit digital data for both text messages and voice messages, the transceiver including a receiver adapted to receive digital data for both text messages and voice messages;

a voice activated wireless electronic device with a keyboard and a screen, preferably adapted to use Bluetooth protocol, the electronic device being built into the dashboard and adapted to receive and transmit digital data in both text form and voice form;

a voice assembly including a speaker and a microphone, the speaker being mounted in the roof adjacent to the windshield above the driver area, the microphone being mounted in the dashboard in proximity to the driver area;

a text assembly including a projector mounted in the dashboard and adapted to create a heads-up display on the windshield of text from the digital data received and transmitted by the voice activated wireless device, the display having a lower extent adjacent to the dashboard, the display having an upper extent below a mid-point of the windshield, the display and the windshield both having a height with the height of the display being between 10 percent and 20 percent of the height of the windshield, the text assembly also including a joystick in the driver area within a convenient reach of a driver, the joystick adapted to allow the driver to manipulate data on both the screen of the electronic device and the display;

a central processing unit operatively coupling the transceiver, electronic device, speaker, microphone and projector for transmitting and receiving messages in text form and in voice form;

a remote telecommunication device chosen from the class of telecommunication devices including cell phones, telephones, computers, and like devices;

intermediate devices including satellites and towers to facilitate data transmission between the remote telecommunication device and the transceiver; and wherein the system is adapted to be programmed through the keyboard of the electronic device.

\* \* \* \* \*